United States Patent
Said et al.

(10) Patent No.: US 10,425,648 B2
(45) Date of Patent: Sep. 24, 2019

(54) VIDEO INTRA-PREDICTION USING POSITION-DEPENDENT PREDICTION COMBINATION FOR VIDEO CODING

(71) Applicant: QUALCOMM Incorporated, San Diego, CA (US)

(72) Inventors: Amir Said, San Diego, CA (US); Xin Zhao, San Diego, CA (US); Jianle Chen, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 263 days.

(21) Appl. No.: 15/272,034

(22) Filed: Sep. 21, 2016

(65) Prior Publication Data
US 2017/0094285 A1    Mar. 30, 2017

Related U.S. Application Data

(60) Provisional application No. 62/234,645, filed on Sep. 29, 2015.

(51) Int. Cl.
H04N 19/159    (2014.01)
H04N 19/105    (2014.01)
(Continued)

(52) U.S. Cl.
CPC ......... *H04N 19/159* (2014.11); *H04N 19/105* (2014.11); *H04N 19/11* (2014.11);
(Continued)

(58) Field of Classification Search
CPC .. H04N 19/159; H04N 19/157; H04N 19/593; H04N 19/146; H04N 19/117;
(Continued)

(56) References Cited

U.S. PATENT DOCUMENTS 10,230,961 B2 * 3/2019 Liu ...................... H04N 19/122
2004/0249777 A1 * 12/2004 Ransing ................. G16H 50/50
706/45

(Continued)

FOREIGN PATENT DOCUMENTS

WO    2012102929 A1    8/2012

OTHER PUBLICATIONS

Shiodera et al. CE6 Subset A: Bidirectional intra prediction, Joint Collaborative Team on Video Coding (JCT-VC) of ITU-T SG16 WP3 and ISO/IEC JTC1/SC29/WG11, 4th meeting: Daegu, KR, Jan. 20-28, 2011 (Year: 2011).*

(Continued)

*Primary Examiner* — Richard A Hansell, Jr.
(74) *Attorney, Agent, or Firm* — Shumaker & Sieffert, P.A.

(57) ABSTRACT

Techniques are described to improved video intra prediction using position-dependent prediction combination in video coding. In High Efficiency Video Encoding a set of 35 linear predictors are used for doing intra coding and prediction can be computed from either a nonfiltered or a filtered set of neighboring "reference" pixels, depending on the selected predictor mode and block size. Techniques of this disclosure may use a weighted combination of both the nonfiltered and filtered set of reference pixels to achieve better compression via improved prediction and therefore small residual, enable effective parallel computation of all sets of prediction values, and maintain low complexity via applying filtering only to a set of reference pixels and not to predicted values themselves.

36 Claims, 7 Drawing Sheets

(51) Int. Cl.

| | | |
|---|---|---|
| *H04N 19/117* | (2014.01) | |
| *H04N 19/147* | (2014.01) | |
| *H04N 19/157* | (2014.01) | |
| *H04N 19/176* | (2014.01) | |
| *H04N 19/182* | (2014.01) | |
| *H04N 19/70* | (2014.01) | |
| *H04N 19/593* | (2014.01) | |
| *H04N 19/11* | (2014.01) | |
| *H04N 19/146* | (2014.01) | |
| *H04N 19/172* | (2014.01) | |

(52) U.S. Cl.
CPC ......... *H04N 19/117* (2014.11); *H04N 19/146* (2014.11); *H04N 19/147* (2014.11); *H04N 19/157* (2014.11); *H04N 19/176* (2014.11); *H04N 19/182* (2014.11); *H04N 19/593* (2014.11); *H04N 19/70* (2014.11); *H04N 19/172* (2014.11)

(58) Field of Classification Search
CPC ...... H04N 19/105; H04N 19/11; H04N 19/70; H04N 19/182; H04N 19/176; H04N 19/147; H04N 19/172
See application file for complete search history.

(56) References Cited

U.S. PATENT DOCUMENTS

| | | | | |
|---|---|---|---|---|
| 2012/0195378 | A1* | 8/2012 | Zheng | H04N 19/105 375/240.12 |
| 2012/0207216 | A1* | 8/2012 | Yu | H04N 19/105 375/240.12 |
| 2012/0287995 | A1* | 11/2012 | Budagavi | H04N 19/11 375/240.12 |
| 2013/0182971 | A1* | 7/2013 | Leontaris | G06T 5/002 382/275 |
| 2015/0023405 | A1* | 1/2015 | Joshi | H04N 19/176 375/240.02 |
| 2015/0110174 | A1* | 4/2015 | Gu | H04N 19/105 375/240.03 |
| 2018/0176587 | A1* | 6/2018 | Panusopone | H04N 19/593 |
| 2018/0288408 | A1* | 10/2018 | Ikai | H04N 19/105 |
| 2019/0089952 | A1* | 3/2019 | Liu | H04N 19/11 |

OTHER PUBLICATIONS

Shiodera etal. CE6 Subset A: Bidirectional intra prediction, Joint Collaborative Team on Video Coding (JCT-VC) of ITU-T SGI 6 WP3 and ISO/I EC JTC1/SC29/WG11,4th meeting: Daegu, KR, Jan. 20-28, 2011 (Year: 2011).*

International Search Report and Written Opinion of International Application No. PCTPCT/US2016/053126, dated Dec. 9, 2016, 13 pp.

Said A., et al., "Position Dependent Intra Prediction Combination", Qualcomm Incorporated, International Organisation or Standardisation Organisation Internationale De Normalisation ISO/IEC JTC1/SC29/WG11 Coding of Moving Pictures and Audio, ISO/IEC JTC1/SC29/WG11 MPEG2015/M37502, Geneva, CH, Oct. 2015, 4 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

ITU-T H.263, Series H: Audiovisual and Multimedia Systems, Infrastructure of audiovisual services—Coding of moving video, Video coding for low bit rate communication, The International Telecommunication Union, Jan. 2005, 226 pp.

ITU-T H.262, Series H: Audiovisual and Multimedia Systems, Infrastructure of audiovisual services—Coding of moving video, Information technology—Generic coding of moving pictures and associated audio information: Video, The International Telecommunication Union, Feb. 2000, 211 pp.

ITU-T H.261, Line Transmission of Non-Telephone Signals, Video Codec for Audiovisual Services At p × 64 kbits, The International Telecommunication Union, Mar. 1993, 32 pp.

Wang et al., High Efficiency Video Coding (HEVC) Defect Report, Joint Collaborative Team on Video Coding (JCT-VC) of ITU-T SG 16 WP 3 and ISO/IEC JTC 1/SC 29/WG 11, 14th Meeting: Vienna, AT, Jul. 25-Aug. 2, 2013, JCTVC-N1003_v1, Sep. 27, 2013, 312 pp.

Tech et al., "MV-HEVC Draft Text 8", Joint Collaborative Team on 3D Video Coding Extensions of ITU-T SG 16 WP 3 and ISO/IEC JTC 1/SC 291WG 11, 8th Meeting: Valencia, ES, Mar. 29-Apr. 4, 2014, JCT3V-H1002-v5, Jun. 3, 2014, 164 pp.

Chen et al., "Preliminary version of High efficiency video coding (HEVC) scalable extension Draft 6", Joint Collaborative Team on Video Coding (JCT-VC) of ITU-T SG 16 WP 3 and ISO/IEC JTC 1/SC 29/WG 11, 17th Meeting: Valencia, ES, Mar. 27-Apr. 4, 2014, JCTVC-Q1008_v2, May 10, 2014, 160 pp.

ITU-T H.223, Series H: Audiovisual and Multimedia Systems, Infrastructure of audiovisual services—Transmission multiplexing and synchronization, Multiplexing protocol for low bit rate multimedia communication, The International Telecommunication Union. Jul. 2001, 74 pp.

Sullivan G.J., et al., "Overview of the High Efficiency Video Coding (HEVC) Standard", IEEE Transactions on Circuits and Systems for Video Technology, vol. 22, No. 12, Dec. 2012, pp. 1649-1668.

Wien., "High Efficiency Video Coding, Coding Tools and Specification", Institut fur Nachrichtentechnik RWTH Aachen University, Aachen Germany, Springer Heidelberg New York Dordrecht London, May 2014, 22 pp.

Lainema J., et al., "Intra Coding of the HEVC Standard", IEEE Transactions on Circuits and Systems for Video Technology, vol. 22, No. 12, Dec. 2012, 10 pp.

Chen J., et al., "Further improvements to HMKTA-1.0" ITU-Telecommunications Standardization Sector Study Group 16 Question 6 Video Coding Experts Group (VCEG), 52nd Meeting: Jun. 19-26, 2015, Warsaw Poland, VCEG-AZ07, 8 pp.

Bossen, "Common test conditions and software reference configurations," JCT-VC Meeting; Jan. 14-23, 2013; (Joint Collaborative Team on Video Coding (JCT-VC) of ITU-T SG16 WP3 and ISO/IEC JTC1/SC29/WG11); No. JCTVC-L1100, 4 pp.

Aubury et al., "Binomial Filters", Journal of VLSI Signal Processing, Kluwer Academic Publishers, Boston, Nov. 15, 1994, Revised Jul. 24, 1995, 27 pp.

Tech et al., MV-HEVC Draft Text 3 (ISO/IEC 23008-2:201x/PDAM2), Joint Collaborative Team on Video Coding Extension Development of ITU-T SG16 WP3 and ISO/IEC JTC1/SC29/WG11, 3rd Meeting: Geneva, CH, Jan. 17-23, 2013, JCT3V-C1004_d3, Mar. 27, 2013, 34 pp.

International Preliminary Report on Patentability from International Application No. PCT/US2016/053126, dated Nov. 20, 2017, 8 pp.

Response to Written Opinion dated Dec. 9, 2016, from International Application No. PCT/US2016/053126, filed on Jul. 25, 2017, 5 pp.

Second Written Opinion from International Application No. PCT/US2016/053126, dated Aug. 28, 2017, 7 pp.

\* cited by examiner

VIDEO INTRA-PREDICTION USING POSITION-DEPENDENT PREDICTION COMBINATION FOR VIDEO CODING

This application claims the benefit of U.S. Provisional Patent Application 62/234,645, filed Sep. 29, 2015, the entire content of which is incorporated herein by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in various standards including defined by ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264/MPEG-4, Part 10, Advanced Video Coding (AVC), and ITU-T H.265, High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques related to improved video intra prediction using position-dependent prediction combination in video coding. The techniques may be used in the context of advanced video codecs, such as extensions of HEVC or the next generation of video coding standards. In HEVC, for example, a set of 35 linear predictors are used for doing intra coding and prediction can be computed from either a nonfiltered or a filtered set of neighboring "reference" pixels, depending on the selected predictor mode and block size. Techniques of this disclosure may use a weighted combination of both the nonfiltered and filtered set of reference pixels to achieve better compression (via, e.g., improved prediction and therefore small residual), enable effective parallel computation of all sets of prediction values, and maintain low complexity (via, e.g., applying filtering only to a set of reference pixels and not to predicted values themselves).

In one example, this disclosure is directed to a method of decoding video data, the method comprising decoding neighboring blocks to a current block in a picture of video data; forming a filtered reference array comprising a plurality of filtered reference values comprising filtered versions of neighboring pixels to the current block in the neighboring blocks; forming a non-filtered reference array comprising a plurality of non-filtered reference values corresponding to non-filtered versions of the neighboring pixels; computing a set of predictive values associated with a set of pixels of the current block based on a linear combination of one or more of the plurality of filtered reference values in the filtered reference array multiplied by a first set of weights and one or more of the plurality of non-filtered reference values in the non-filtered reference array multiplied by a second set of weights; and reconstructing the current block based on the computed set of predictive values.

In another example, this disclosure is directed to a method of encoding video data, the method comprising receiving a current block of a picture, a filtered reference array comprising a plurality of filtered reference values, and a non-filtered reference array comprising a plurality of non-filtered reference values; decoding neighboring blocks to a current block in a picture of video data; forming a filtered reference array comprising a plurality of filtered reference values comprising filtered versions of neighboring pixels to the current block in the neighboring blocks; forming a non-filtered reference array comprising a plurality of non-filtered reference values corresponding to non-filtered versions of the neighboring pixels; generating a predictive block for the current block, wherein generating comprises computing a set of predictive values associated with a set of pixels of the current block based on a linear combination of one or more of the plurality of filtered reference values in the filtered reference array multiplied by a first set of weights and one or more of the plurality of non-filtered reference values in the non-filtered reference array multiplied by a second set of weights; generating a residual block based on a difference between the current block and the predictive block; and encoding data that represents the residual block in a bitstream.

In another example, this disclosure is directed to a device for decoding video data, the device comprising a memory and one or more processors in communication with the memory. The one or more processors are configured to decode neighboring blocks to a current block in a picture of video data; form a filtered reference array comprising a plurality of filtered reference values comprising filtered versions of neighboring pixels to the current block in the neighboring blocks; form a non-filtered reference array comprising a plurality of non-filtered reference values corresponding to non-filtered versions of the neighboring pixels; compute a set of predictive values associated with a set of pixels of the current block based on a linear combination of one or more of the plurality of filtered reference values in the filtered reference array multiplied by a first set of weights and one or more of the plurality of non-filtered reference values in the non-filtered reference array multiplied by a second set of weights; and reconstruct the current block based on the computed set of predictive values.

In another example, this disclosure is directed to a device for encoding video data, the device comprising a memory and one or more processors in communication with the memory. The one or more processors are configured to receive a current block of a picture, a filtered reference array comprising a plurality of filtered reference values, and a non-filtered reference array comprising a plurality of non-filtered reference values; decode neighboring blocks to a current block in a picture of video data; form a filtered reference array comprising a plurality of filtered reference values comprising filtered versions of neighboring pixels to the current block in the neighboring blocks; form a non-filtered reference array comprising a plurality of non-filtered reference values corresponding to non-filtered versions of the neighboring pixels; generate a predictive block for the current block, wherein generating comprises computing a set of predictive values associated with a set of pixels of the current block based on a linear combination of one or more of the plurality of filtered reference values in the filtered reference array multiplied by a first set of weights and one or more of the plurality of non-filtered reference values in the non-filtered reference array multiplied by a second set of weights; generate a residual block based on a difference between the current block and the predictive block; and encode data that represents the residual block in a bitstream.

In another example, this disclosure is directed to a device for of decoding video data, the device comprising means for decoding neighboring blocks to a current block in a picture of video data; means for forming a filtered reference array comprising a plurality of filtered reference values comprising filtered versions of neighboring pixels to the current block in the neighboring blocks; means for forming a non-filtered reference array comprising a plurality of non-filtered reference values corresponding to non-filtered versions of the neighboring pixels; means for computing a set of predictive values associated with a set of pixels of the current block based on a linear combination of one or more of the plurality of filtered reference values in the filtered reference array multiplied by a first set of weights and one or more of the plurality of non-filtered reference values in the non-filtered reference array multiplied by a second set of weights; and means for reconstructing the current block based on the computed set of predictive values.

In another example, this disclosure is directed to a device for encoding video data, the device comprising means for receiving a current block of a picture, a filtered reference array comprising a plurality of filtered reference values, and a non-filtered reference array comprising a plurality of non-filtered reference values; means for decoding neighboring blocks to a current block in a picture of video data; means for forming a filtered reference array comprising a plurality of filtered reference values comprising filtered versions of neighboring pixels to the current block in the neighboring blocks; means for forming a non-filtered reference array comprising a plurality of non-filtered reference values corresponding to non-filtered versions of the neighboring pixels; means for generating a predictive block for the current block, wherein generating comprises computing a set of predictive values associated with a set of pixels of the current block based on a linear combination of one or more of the plurality of filtered reference values in the filtered reference array multiplied by a first set of weights and one or more of the plurality of non-filtered reference values in the non-filtered reference array multiplied by a second set of weights; means for generating a residual block based on a difference between the current block and the predictive block; and means for encoding data that represents the residual block in a bitstream.

In a further example, this disclosure is directed to a non-transitory computer-readable medium having stored thereon instructions for processing video data that, when executed, cause one or more processors to decode neighboring blocks to a current block in a picture of video data; form a filtered reference array comprising a plurality of filtered reference values comprising filtered versions of neighboring pixels to the current block in the neighboring blocks; form a non-filtered reference array comprising a plurality of non-filtered reference values corresponding to non-filtered versions of the neighboring pixels; compute a set of predictive values associated with a set of pixels of the current block based on a linear combination of one or more of the plurality of filtered reference values in the filtered reference array multiplied by a first set of weights and one or more of the plurality of non-filtered reference values in the non-filtered reference array multiplied by a second set of weights; and reconstruct the current block based on the computed set of predictive values.

In a further example, this disclosure is directed to a non-transitory computer-readable medium having stored thereon instructions for processing video data that, when executed, cause one or more processors to receive a current block of a picture, a filtered reference array comprising a plurality of filtered reference values, and a non-filtered reference array comprising a plurality of non-filtered reference values; decode neighboring blocks to a current block in a picture of video data; form a filtered reference array comprising a plurality of filtered reference values comprising filtered versions of neighboring pixels to the current block in the neighboring blocks; form a non-filtered reference array comprising a plurality of non-filtered reference values corresponding to non-filtered versions of the neighboring pixels; generate a predictive block for the current block, wherein generating comprises computing a set of predictive values associated with a set of pixels of the current block based on a linear combination of one or more of the plurality of filtered reference values in the filtered reference array multiplied by a first set of weights and one or more of the plurality of non-filtered reference values in the non-filtered reference array multiplied by a second set of weights; generate a residual block based on a difference between the current block and the predictive block; and encode data that represents the residual block in a bitstream.

The details of one or more examples are set forth in the accompanying drawings and the description below. Other features, objects, and advantages will be apparent from the description and drawings, and from the claims.

DETAILED DESCRIPTION

In general, this disclosure describes techniques related to improved video intra prediction using position-dependent prediction combination in video coding. The techniques may be used in the context of advanced video codecs, such as extensions of HEVC or the next generation of video coding standards.

The techniques of this disclosure are generally described with respect to ITU-T H.265, also referred to as High Efficiency Video Coding (HEVC), which is described in "SERIES H: AUDIOVISUAL AND MULTIMEDIA SYSTEMS, Infrastructure of audiovisual services—Coding of moving video," *High Efficiency Video Coding*, ITU-T H.265, April 2013. However, these techniques may be applied to other video coding standards, including extensions of HEVC and extensions of other standards. Examples of other video coding standards include ITU-T H.261, ISO/IEC MPEG-1 Visual, ITU-T H.262 or ISO/IEC MPEG-2 Visual, ITU-T H.263, ISO/IEC MPEG-4 Visual, and ITU-T H.264/MPEG-4, Part 10, Advanced Video Coding (AVC), including its Scalable Video Coding (SVC) and Multiview Video Coding (MVC) extensions.

The H.265 standard was recently finalized by the Joint Collaboration Team on Video Coding (JCT-VC) of ITU-T Video Coding Experts Group (VCEG) and ISO/IEC Motion Picture Experts Group (MPEG). The latest HEVC draft specification, referred to as HEVC WD hereinafter, is available from http://phenix.int-evry.fr/jct/doc_end_user/documents/14_Vienna/wg11/JCTVC-N1003-v1.zip.

The multiview extension to HEVC, MV-HEVC, has also been developed by the JCT-3V. An example of a Working Draft (WD) of MV-HEVC, referred to as MV-HEVC WD8, is available from phenix.it-sudparis.eu/jct2/doc_end_user/documents/8_Valencia/wg11/JCT3V-H1002-v5.zip. A scalable extension to HEVC, named SHVC, has also been developed by the JCT-VC. An example of a Working Draft (WD) of SHVC, referred to as SHVC WD6, is available from phenix.it-sudparis.eu/jct/doc_end_user/documents/17_Valencia/wg11/JCTVC-Q1008-v2.zip.

Figure 1:
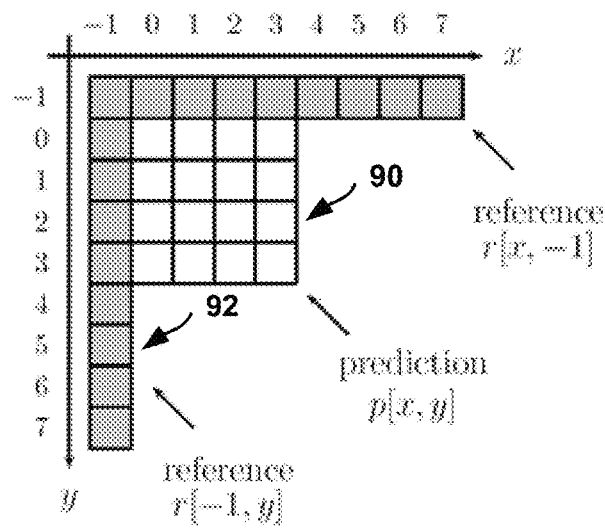
FIG. 1 is a diagram illustrating a block of 4×4 pixels that are to be predicted in intra-frame coding that may utilize techniques described in this disclosure.

In the HEVC video compression standard, intra-frame prediction is applied to blocks with N×N pixels, using a group of 4N+1 pixels that are adjacent to the block to be predicted, namely reference pixels. Those reference pixels have values that have been reconstructed and are known at the encoder and decoder when the block prediction is computed. For example, FIG. 1 shows a block of 4×4 pixels that are to be predicted in the intra-frame coding method used by HEVC. The pixels to be predicted 90 are shown as white squares and the reference pixels 92 as gray squares.

Intra prediction is a coding tool which is employed to reduce or remove spatial redundancies using neighboring pixels within one image. To find exact prediction directions and remove redundancies effectively, HEVC may use up to 35 prediction modes for each PU. There may be two sets of values that are used for prediction, depending on predictor mode (planar, DC, or directional), and block size. For each mode, either an unfiltered or a filtered version of the reference pixels can be used for prediction. HEVC, for example, defines a fixed table for determining whether to use filtered or unfiltered reference pixels in intra prediction.

Figure 2:
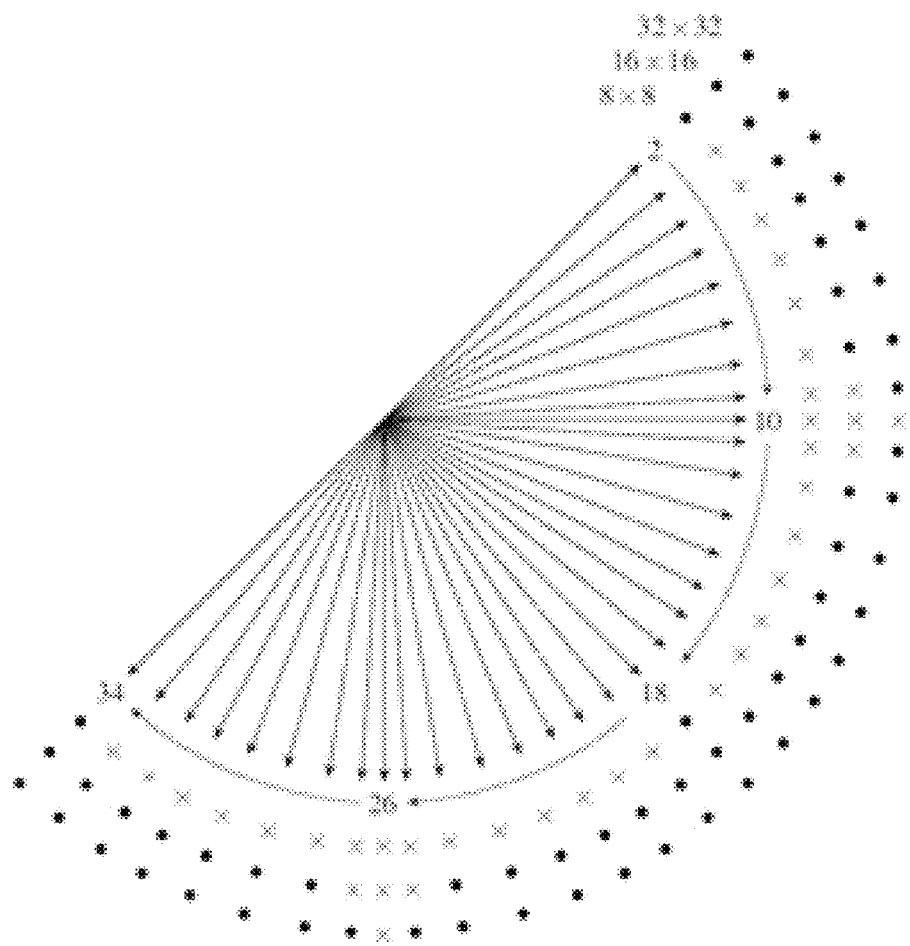
FIG. 2 is a diagram illustrating filter settings for the directional predictors based on the block size.

FIG. 2 is a conceptual diagram illustrating a graphical representation defining filter settings for directional prediction based on the block size. A circle is shown in FIG. 2 where a prediction mode (e.g., directional prediction mode) uses reference sample filtering for a particular block size (e.g. 8×8, 16×16, and 32×32). A gray "x" is shown in FIG. 2 where a prediction mode uses nonfiltered reference samples for a particular block size. For example, prediction modes 2, 18, and 34 may use filtered reference pixels regardless of block size, modes 10 and 26 may utilize unfiltered reference pixels regardless of block size, modes 3-8, 12-17, 19-24, and 28-33 may utilize unfiltered reference pixels in blocks of size 8×8 but uses filtered reference pixels in blocks of sizes 16×16 and 32×32, and modes 9, 11, 25, and 27 utilize unfiltered reference pixels in blocks of sizes 8×8 and 16×16 and filtered reference pixels in blocks of size 32×32. Furthermore, there may be one type of low-pass filter that can be used, with the three taps (¼, ½, ¼).

Current methods may be more suitable for the low resolution videos used in the past, where best compression is achieved with mostly small blocks (e.g., 4×4 or 8×8). However, a more recent trend is to have 1080×1920 HD video or 2160×3840 UHD video. For those resolutions, prediction using larger block sizes may be more efficient and obtain better compression.

Stronger low-pass filtering of the reference in those larger blocks may be utilized to obtain better compression. However, in those cases a single low-pass filter that optimizes prediction for all blocks of a given block size and the optimal filter varies according to the texture in each block.

A video device implementing the current HEVC standard uses prediction that is based on either the filtered reference or the unfiltered reference, which does not support a way to combine information from those two cases, even though that data can be readily available at the encoder and decoder.

A video coding device, such as a video encoder or a video decoder, may use the techniques of the present disclosure to perform position-dependent prediction combination (PDPC), that is, use one or more parameterized equations defining how to combine predictions based on filtered and unfiltered reference values, and on the position of the predicted pixel. The present disclosure describes several sets of parameters, such that the encoder can test each one (via, e.g., using rate-distortion analysis) and signal to the decoder the optimal parameters (e.g., the parameters resulting in the best rate-distortion performance among those parameters that are tested).

Figure 4:
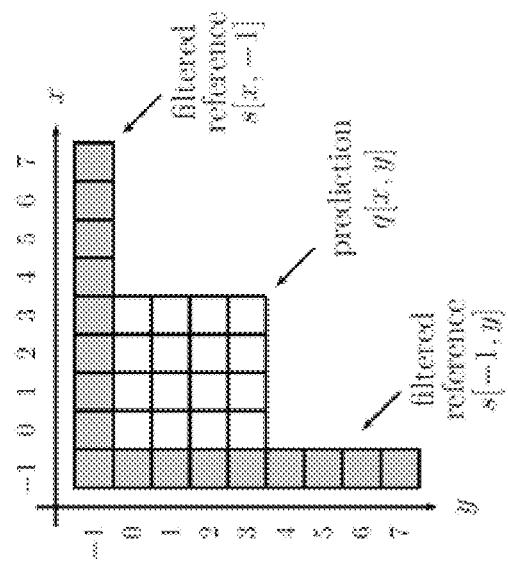
FIG. 4 illustrates a prediction of a 4×4 block using a filtered reference according to techniques of the present disclosure.
Figure 3:
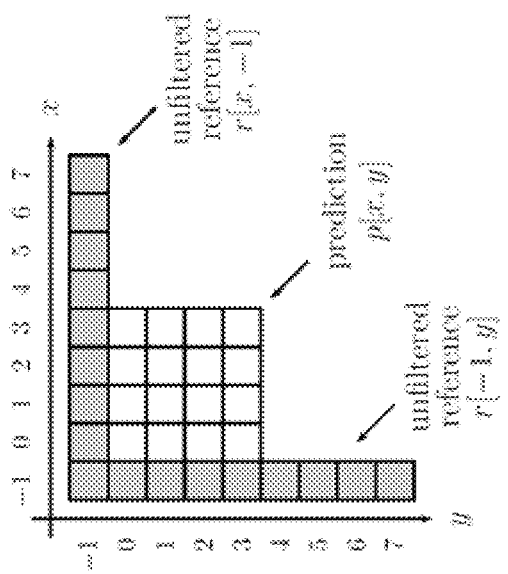
FIG. 3 illustrates a prediction of a 4×4 block using an unfiltered reference according to techniques of the present disclosure.

FIG. 3 illustrates a prediction of a 4×4 block (p) using an unfiltered reference (r) according to techniques of the present disclosure. FIG. 4 illustrates a prediction of a 4×4 block (q) using a filtered reference (s) according to techniques of the present disclosure. While both FIGS. 3 and 4 illustrate a 4×4 pixel block and 17 (4×4+1) respective reference values, the techniques of the present disclosure may be applied to any block size and number of reference values.

A video coder performing Position-Dependent Prediction Combination may utilize a combination between the filtered (q) and unfiltered (p) predictions, such that a predicted block for a current block to be coded can be computed using pixel values from both the filtered (s) and unfiltered (r) reference arrays.

In one example of the techniques of PDPC, given any two set of pixel predictions $p_r[x,y]$ and $q_s[x,y]$, computed using only the unfiltered and filtered references r and s, respectively, the combined predicted value of a pixel, denoted by $v[x,y]$, is defined by $$v[x,y]=c[x,y]p_r[x,y]+(1-c[x,y])q_s[x,y] \quad (1)$$

where $c[x,y]$ is the set of combination parameters. The value of the weight $c[x,y]$ may be a value between 0 and 1. The sum of the weights $c[x,y]$ and $(1-c[x,y])$ may be equal to one.

In certain examples it may not be practical to have a set of parameters as large as the number of pixels in the block. In such examples $c[x,y]$ may be defined by a much smaller set of parameters, plus an equation to compute all combination values from those parameters. In such an example the following formula may be used:

$$v[x, y] = \left\lfloor \frac{c_1^{(v)}r[x,-1] - c_2^{(v)}r[-1,-1]}{2^{\lfloor y/d_v \rfloor}} \right\rfloor + \left\lfloor \frac{c_1^{(h)}r[-1,y] - c_2^{(h)}r[-1,-1]}{2^{\lfloor x/d_h \rfloor}} \right\rfloor + \left( \frac{N - \min(x,y)}{N} \right) g \, p_r^{(HEVC)}[x,y] + b[x,y] \, q_s^{(HEVC)}[x,y] \quad (2)$$

where $c_1^v$, $c_2^v$, $c_1^h$, $c_2^h$, g, and $d_v$, $d_h \in \{1,2\}$, are prediction parameters, N is the block size, $p_r^{(HEVC)}[x,y]$ and $q_s^{(HEVC)}[x,y]$ are prediction values computed using the according to the HEVC standard, for the specific mode, using respectively the nonfiltered and filtered references, and $$b[x,y] = 1 - \left\lfloor \frac{c_1^{(v)} - c_2^{(v)}}{2^{\lfloor y/d_v \rfloor}} \right\rfloor - \left\lfloor \frac{c_1^{(h)} - c_2^{(h)}}{2^{\lfloor x/d_h \rfloor}} \right\rfloor - \left( \frac{N - \min(x,y)}{N} \right) g \quad (3)$$

is a normalization factor (i.e., to make the overall weights assigned to $p_r^{(HEVC)}[x,y]$ and $q_s^{(HEVC)}[x,y]$ add to 1), defined by the prediction parameters.

Formula 2 may be generalized for any video coding standard in formula 2A:

$$v[x, y] = \left\lfloor \frac{c_1^{(v)}r[x,-1] - c_2^{(v)}r[-1,-1]}{2^{\lfloor y/d_v \rfloor}} \right\rfloor + \left\lfloor \frac{c_1^{(h)}r[-1,y] - c_2^{(h)}r[-1,-1]}{2^{\lfloor x/d_h \rfloor}} \right\rfloor + \left( \frac{N - \min(x,y)}{N} \right) g \, p_r^{(STD)}[x,y] + b[x,y] \, q_s^{(STD)}[x,y] \quad (2A)$$

where $c_1^v$, $c_2^v$, $c_1^h$, $c_2^h$, g, and $d_v$, $d_h \in \{1,2\}$, are prediction parameters, N is the block size, $p_r^{(STD)}[x,y]$ and $q_s^{(STD)}[x,y]$ are prediction values computed using the according to a video coding standard (or video coding scheme or algorithm), for the specific mode, using respectively the nonfiltered and filtered references, and $$b[x,y] = 1 - \left\lfloor \frac{c_1^{(v)} - c_2^{(v)}}{2^{\lfloor y/d_v \rfloor}} \right\rfloor - \left\lfloor \frac{c_1^{(h)} - c_2^{(h)}}{2^{\lfloor x/d_h \rfloor}} \right\rfloor - \left( \frac{N - \min(x,y)}{N} \right) g \quad (3A)$$

is a normalization factor (i.e., to make the overall weights assigned to $p_r^{(STD)}[x,y]$ and $q_s^{(STD)}[x,y]$ add to 1), defined by the prediction parameters.

These prediction parameters may include weights to provide an optimal linear combination of the predicted terms according to the type of prediction mode used (e.g., DC, planar, and 33 directional modes of HEVC). For example, HEVC contains 35 prediction modes. A lookup table may be constructed with values for each of the prediction parameters $c_1^v$, $c_2^v$, $c_1^h$, $c_2^h$, g, $d_v$, and $d_h$ for each of the prediction modes (i.e., 35 values of $c_1^v$, $c_2^v$, $c_1^h$, $c_2^h$, g, $d_v$, and $d_h$ for each prediction mode). Such values may be encoded in a bitstream with the video or may be constant values known by the encoder and decoder ahead of time and may not need to be transmitted in a file or bitstream. The values for $c_1^v$, $c_2^v$, $c_1^h$, $c_2^h$, g, $d_v$, and $d_h$ may be determined by an optimization training algorithm by finding the values for the prediction parameters that give best compression for a set of training videos. In another example, there are a plurality of predefined prediction parameter sets for each prediction mode (in e.g. a lookup table) and the prediction parameter set selected (but not the parameters themselves) is transmitted to a decoder in an encoded file or bitstream. In another example the values for $c_1^v$, $c_2^v$, $c_1^h$, $c_2^h$, g, $d_v$, and $d_h$ may be generated on the fly by a video encoder and transmitted to a decoder in an encoded file or bitstream.

In another example, instead of using HEVC prediction, a video coding device performing these techniques may use a modified version of HEVC, like one that uses 65 directional predictions instead of 33 directional predictions. In fact, any type of intra-frame prediction can be used.

In another example, the formula can be chosen to facilitate computations. For example, we can use the following type of predictor $$v[x, y] = \left\lfloor \frac{c_1^{(v)}r[x,-1] - c_2^{(v)}r[-1,-1]}{2^{\lfloor y/d_v \rfloor}} \right\rfloor + \left\lfloor \frac{c_1^{(h)}r[-1,y] - c_2^{(h)}r[-1,-1]}{2^{\lfloor x/d_h \rfloor}} \right\rfloor + b[x,y] \, p_{a,r,s}^{(HEVC)}[x,y] \text{ where} \quad (4)$$

$$b[x,y] = 1 - \left\lfloor \frac{c_1^{(v)} - c_2^{(v)}}{2^{\lfloor y/d_v \rfloor}} \right\rfloor - \left\lfloor \frac{c_1^{(h)} - c_2^{(h)}}{2^{\lfloor x/d_h \rfloor}} \right\rfloor \quad (5)$$

and $$p_{a,r,s}^{(HEVC)}[x,y] = a \, p_r^{(HEVC)}[x,y] + (1-a) \, q_s^{(HEVC)}[x,y]. \quad (6)$$

Such an approach may exploit the linearity of the HEVC (or other) prediction. Defining h as the impulse response of a filter k from a predefined set, if we have $$s = ar + (1-a)(h*r) \quad (7)$$

where "*" represents convolution, then $$p_{a,r,s}^{(HEVC)}[x,y] = p_s^{(HEVC)}[x,y] \quad (8)$$

i.e., the linearly combined prediction may be computed from the linearly combined reference.

Formulas 4, 6 and 8 may be may be generalized for any video coding standard in formula 4A, 6A, and 8A:

$$v[x, y] = \left\lfloor \frac{c_1^{(v)} r[x, -1] - c_2^{(v)} r[-1, -1]}{2^{\lfloor y/d_v \rfloor}} \right\rfloor + \quad (4A)$$

$$\left\lfloor \frac{c_1^{(h)} r[-1, y] - c_2^{(h)} r[-1, -1]}{2^{\lfloor x/d_h \rfloor}} \right\rfloor + b[x, y] \, p_{a,r,s}^{(STD)}[x, y] \text{ where}$$

$$b[x, y] = 1 - \left\lfloor \frac{c_1^{(v)} - c_2^{(v)}}{2^{\lfloor y/d_v \rfloor}} \right\rfloor - \left\lfloor \frac{c_1^{(h)} - c_2^{(h)}}{2^{\lfloor x/d_h \rfloor}} \right\rfloor \quad (5A)$$

and $$p_{a,r,s}^{(STD)}[x, y] = a \, p_r^{(STD)}[x, y] + (1 - a) \, q_s^{(STD)}[x, y]. \quad (6A)$$

Such an approach may exploit the linearity of the prediction of the coding standard. Defining h as the impulse response of a filter k from a predefined set, if we have $$s = ar + (1-a)(h*r) \quad (7A)$$

where "*" represents convolution, then $$p_{a,r,s}^{(STD)}[x,y] = p_s^{(STD)}[x,y] \quad (8A)$$

i.e., the linearly combined prediction may be computed from the linearly combined reference.

In an example, prediction functions may use the reference vector (e.g., r and s) only as input. In this example, the behavior of the reference vector does not change if the reference has been filtered or not filtered. If r and s are equal (e.g., some unfiltered reference r happens to be the same as another filtered reference s) then predictive functions, e.g. $p_r[x,y]$ (also written as $p(x,y,r)$) is equal to $p_s[x,y]$ (also written as $p(x,y,s)$), applied to filtered and unfiltered references are equal. Additionally, pixel predictions p and q may be equivalent (e.g., produce the same output given the same input). In such an example, formulas (1)-(8) may be rewritten with pixel prediction p [x,y] replacing pixel prediction q [x,y].

In another example, the prediction (e.g., the sets of functions) may change depending on the information that a reference has been filtered. In this example, different sets of functions can be denoted (e.g., $p_r[x,y]$ and $q_s[x,y]$). In this case, even if r and s are equal, $p_r[x,y]$ and $q_s[x,y]$ may not be equal. In other words, the same input can create different output depending on whether the input has been filtered or not. In such an example, p [x,y] may not be able to be replaced by q [x,y].

An advantage of the prediction equations shown is that, with the parameterized formulation, sets of optimal parameters can be determined (i.e., those that optimize the prediction accuracy), for different types of video textures, using techniques such as training. This approach, in turn, may be extended in some examples by computing several sets of predictor parameters, for some typical types of textures, and having a compression scheme where the encoder test predictors from each set, and encodes as side information the one that yields best compression.

Figure 5:
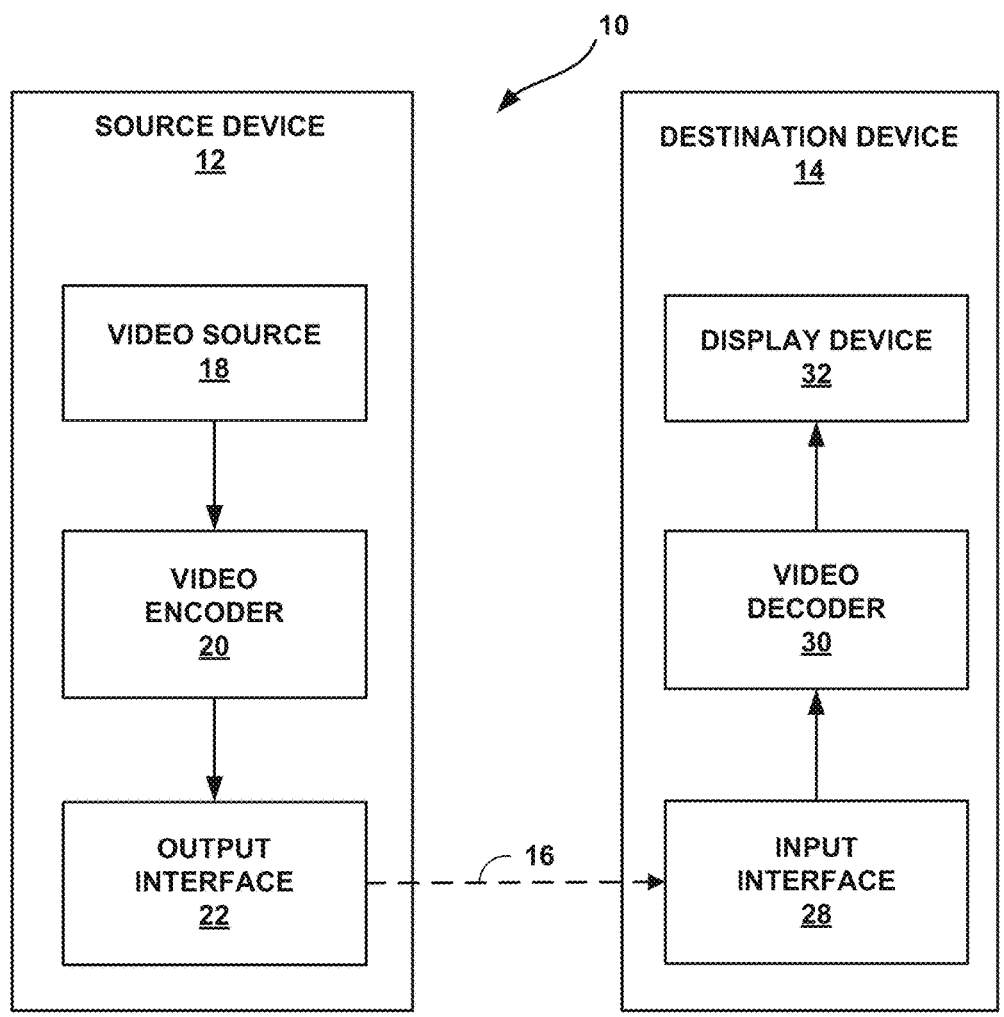
FIG. 5 is a block diagram illustrating an example video encoding and decoding system that may utilize techniques described in this disclosure.

FIG. 5 is a block diagram illustrating an example video encoding and decoding system 10 that may utilize techniques described in this disclosure, including PDPC. As shown in FIG. 5, decoding system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, decoding system 10 may be configured to support one-way or two-way video transmission to support applications such as video streaming, video playback, video broadcasting, and/or video telephony.

In the example of FIG. 5, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques described in this disclosure, such as techniques relating to improved video intra-prediction using position-dependent prediction combination. In accordance with this disclosure, video decoder 30 of destination device 14 may be configured to apply the techniques described in this disclosure, such as techniques relating to improved video intra-prediction using position-dependent prediction combination. In other examples, a source device and a destination device may include other components or arrangements. For example, source device 12 may receive video data from an external video source 18, such as an external camera. Likewise, destination device 14 may interface with an external display device, rather than including an integrated display device.

As noted above, source device 12 includes output interface 22 and destination device 14 includes input interface 28. In some examples, output interface 22 represents a transmitter and input interface 28 represents a receiver. In other examples, output interface 22 and input interface 28 represent examples of transceivers (that is, interfaces capable of both transmitting and receiving data signals wirelessly). The transceivers may be configured to send and receive video data in wireless signals. For example, output interface 22, when implemented as a transceiver, may send a data signal (e.g., computer-readable medium 16) including encoded video data, while input interface 28, when implemented as a transceiver, may receive a data signal (e.g., computer-readable medium 16) including encoded video data. As discussed above, video encoder 20 may provide the encoded video data to output interface 22, while input interface 28 may provide encoded video data to video decoder 30.

The illustrated decoding system 10 of FIG. 5 is merely one example. Techniques described in this disclosure may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, decoding system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the standards described above and, in some examples, according to the High Efficiency Video Coding (HEVC) standard, also referred to as ITU-T H.265, or extensions of the HEVC standard, or according to the next generation of video coding standards. The techniques of this disclosure, however, are not limited to any particular coding standard. Other examples of video coding standards include MPEG-2 and ITU-T H.263. Although not shown in FIG. 5, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to a protocol such as the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In general, a video frame or picture may be divided into a sequence of treeblocks, which are also known as largest coding units (LCUs), that may include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree data structure. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU are also referred to as leaf-CUs even if there is no explicit splitting of the original leaf-CU. For example, if a CU at 16×16 size is not split further, the four 8×8 sub-CUs are also referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, prediction unit (PU), or transform unit (TU), in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and is generally square in shape. The size of the CU may range from 8×8 pixels up to the size of the treeblock with a maximum size, e.g., 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more PUs. In general, a PU represents a spatial area corresponding to all or a portion of the corresponding CU, and may include data for retrieving and/or generating a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. The RQT may also be referred to as a transform tree. In some examples, the intra-prediction mode may be signaled in the leaf-CU syntax, instead of the RQT. As another example, when the PU is inter-mode encoded, the PU may include data defining motion information, such as one or more motion vectors, for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more TUs. The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs) or transform trees as noted above. That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, prediction may be performed for PUs of various sizes. Assuming that the size of a particular CU is 2N×2N, intra-prediction may be performed on PU sizes of 2N×2N or N×N, and inter-prediction may be performed on symmetric PU sizes of 2N×2N, 2N×N, N×2N, or N×N. Asymmetric partitioning for inter-prediction may also be performed for PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In accordance with the techniques of this disclosure, video encoder 20 and video decoder 30 may be configured to intra predict a block of video data using a linear combination of a set of filtered reference values and a set of non-filtered reference values, where the reference values correspond to previously decoded, neighboring pixels. That is, video encoder 20 and video decoder 30 may apply one or more filters to the neighboring pixels to form the set of filtered reference values, and use the neighboring pixels themselves as the non-filtered reference values. Furthermore, the linear combination may include applying respective sets of weights and/or other prediction parameters to the filtered and non-filtered reference values. For example, video encoder 20 and video decoder 30 may calculate a predicted block using any of formulas (1), (2) and (4) as discussed above.

More particularly, as discussed in greater detail below, video encoder 20 generally predicts then encodes video data using these techniques, and may also determine and then signal the prediction parameters to be used during intra prediction. Video decoder 30, likewise, retrieves the prediction parameters from the bitstream, when such prediction parameters are encoded in the bitstream, and then applies these techniques to predict, decode, and reconstruct video data.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block has 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs to include quantized transform coefficients representative of the residual data for the CU. That is, video encoder 20 may calculate the residual data (in the form of a residual block), transform the residual block to produce a block of transform coefficients, and then quantize the transform coefficients to form quantized transform coefficients. Video encoder 20 may form a TU including the quantized transform coefficients, as well as other syntax information (e.g., splitting information for the TU).

As noted above, following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, video encoder 20 may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

In general, video decoder 30 performs a substantially similar, albeit reciprocal, process to that performed by video encoder 20 to decode encoded data. For example, video decoder 30 inverse quantizes and inverse transforms coefficients of a received TU to reproduce a residual block. Video decoder 30 uses a signaled prediction mode (intra- or inter-prediction) to form a predicted block. Then video decoder 30 combines the predicted block and the residual block (on a pixel-by-pixel basis) to reproduce the original block. Additional processing may be performed, such as performing a deblocking process to reduce visual artifacts along block boundaries. Furthermore, video decoder 30 may decode syntax elements using CABAC in a manner substantially similar to, albeit reciprocal to, the CABAC encoding process of video encoder 20.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

Figure 6:
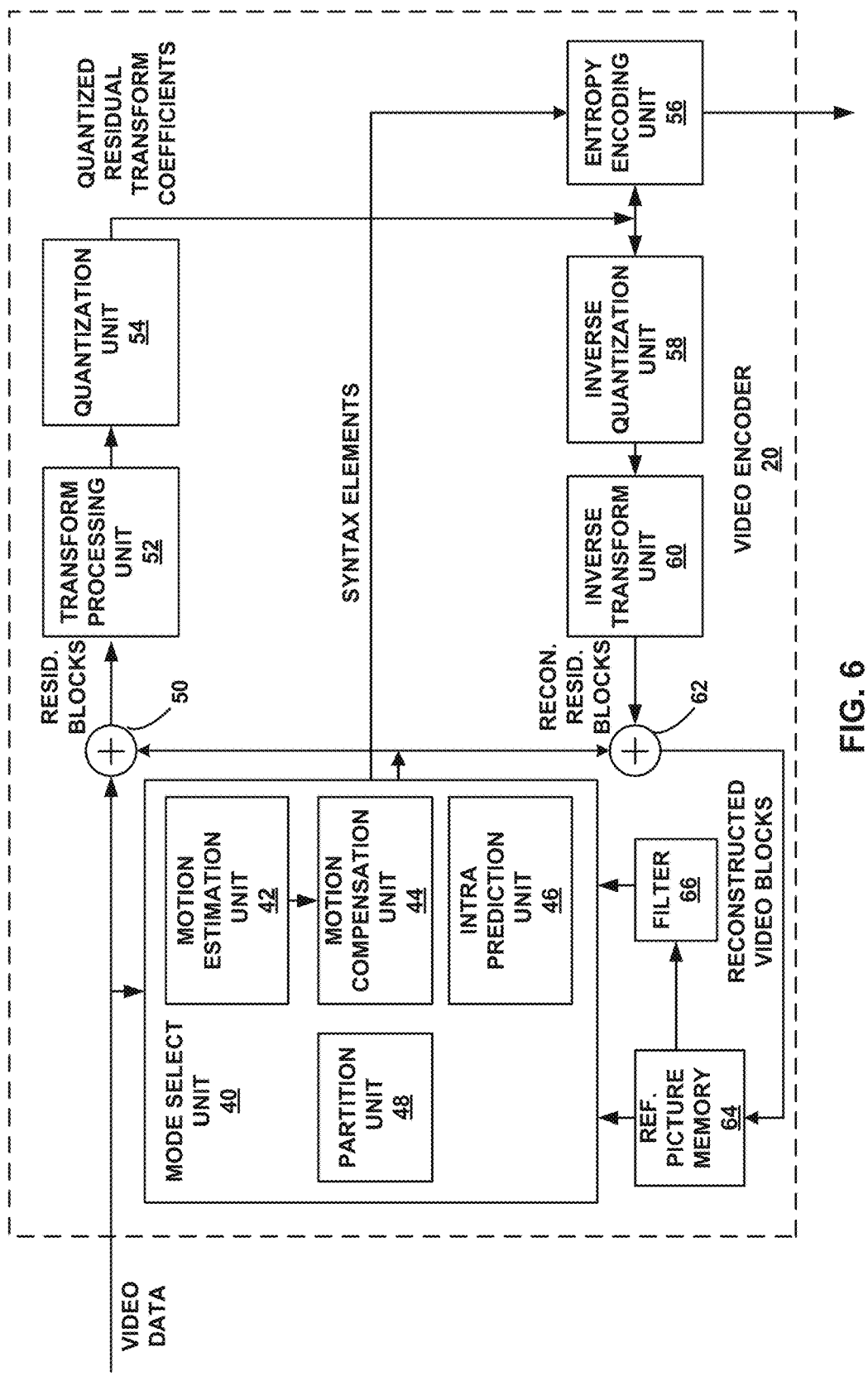
FIG. 6 is a block diagram illustrating an example of a video encoder that may implement techniques described in this disclosure.

FIG. 6 is a block diagram illustrating an example of video encoder 20 that may implement techniques described in this disclosure, such as techniques relating to improved video intra-prediction using position-dependent prediction combination. In accordance with this disclosure, video encoder 20 may be configured to apply the techniques described in this disclosure, such as techniques relating to improved video intra-prediction using position-dependent prediction combination. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 6, video encoder 20 receives a current video block within a video frame to be encoded. In the example of FIG. 2, video encoder 20 includes mode select unit 40, reference picture memory 64 (which may also be referred to as a decoded picture buffer (DPB)), summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. Low-pass filter 66 may receive picture information from reference picture memory 64 and can pre-filter reference samples for use by mode select unit 40 (and intra-prediction unit 46). A deblocking filter (not shown in FIG. 6) may also be included to filter block boundaries to remove blockiness artifacts from reconstructed video. If desired, the deblocking filter would typically filter the output of summer 62. Additional filters (in loop or post loop) may also be used in addition to the deblocking filter and low-pass filter 66.

During the encoding process, video encoder 20 receives a video frame or slice to be coded. The frame or slice may be divided into multiple video blocks. Motion estimation unit 42 and motion compensation unit 44 perform inter-predictive encoding of the received video block relative to one or more blocks in one or more reference frames to provide temporal prediction. Intra-prediction unit 46 may alternatively perform intra-predictive encoding of the received video block relative to one or more neighboring blocks in the same frame or slice as the block to be coded to provide spatial prediction. Video encoder 20 may perform multiple coding passes, e.g., to select an appropriate coding mode for each block of video data.

Low-pass filter 66 may be applied to all blocks or in some examples to blocks above a certain size (e.g., blocks larger than 4×4 in HEVC). In some examples, the low-pass filter 66 may be applied only to reference pixels. A 3-tap low-pass filter may be applied to the blocks of video data. However, one skilled in the art would recognize that any number of types of low-pass filters may be used based on the described techniques.

In examples of the present disclosure, a strong filter may be applied to reference values some or all blocks and combined with the unfiltered and/or the low-pass filtered reference pixels for use in a prediction equation. Further details regarding the use of such filters, and resulting intra-prediction performed by intra-prediction unit 46, are discussed below.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the prediction modes, intra or inter, e.g., based on error results, and provides the resulting predicted block to summer 50 to generate residual data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

Intra-prediction unit 46 may perform prediction from a nonfiltered or a filtered set of neighboring "reference" pixels, depending on the selected predictor mode and block size using position-dependent prediction coordination. Filtered reference pixels may be filtered via low-pass filter 66. Intra-prediction unit 46 may use one or more of a number of exemplary formulas (1)-(8) to calculate a combined predicted value of a pixel.

In one example intra-prediction unit 46, when given any two set of pixel predictions $p_r[x,y]$ and $q_s[x,y]$, computed using only the unfiltered and filtered references r and s, respectively, may calculate a combined predicted value of a pixel, denoted by v[x,y], via formula (1) as defined above.

In another example intra-prediction unit 46 may utilize an equation with a smaller parameter set. In such examples c[x,y] may be defined by a much smaller set of parameters, plus an equation to compute all combination values from those parameters. In such an example formula (2) as defined above may be used by intra-prediction unit 46.

In another example, the formula can be chosen to facilitate computations. For example, intra-prediction unit 46 may use a predictor as defined in formula (4) above. Such an approach may exploit the linearity of the HEVC (or other) prediction as shown in formulas (7) and (8) above.

Intra-prediction unit 46 may select prediction parameters (e.g., $c[x,y]$, $c_1^v$, $c_2^v$, $c_1^h$, $c_2^h$, g, $d_v$, and/or $d_h$) that correspond with the prediction equation used by intra-prediction unit 46 that best fits the prediction (e.g., having the best rate-distortion characteristics).

For example, mode select unit 40 may calculate rate-distortion values using a rate-distortion analysis for the various tested intra-prediction modes, and select the intra-prediction mode and prediction parameters having the best rate-distortion characteristics among the tested modes. Using rate-distortion analysis, mode select unit 40 generally determines an amount of distortion (or error) between an encoded block and an original, unencoded block that was encoded to produce the encoded block, as well as a bitrate (that is, a number of bits) used to produce the encoded block. Mode select unit 40 may calculate ratios from the distortions and rates for the various encoded blocks to determine which intra-prediction mode exhibits the best rate-distortion value for the block. For example, intra-prediction unit 46 may test each of a set of parameterized equations combining filtered and unfiltered reference values. Intra-prediction unit 46 may test each (or a plurality) of sets of parameters to determine which mode and parameters exhibits the best rate-distortion value for the block.

In an example, mode select unit 40 may utilize a table containing prediction parameters for each of the prediction modes. Mode select unit 40 may calculate rate-distortion results for each position dependent prediction combination (PDPC) method as well as for not using PDPC. Mode select unit 40 may then select the prediction mode and prediction parameters (or lack of prediction parameters) that exhibits the best rate-distortion value. In an example where no acceleration technique is used, the number of tests performed by mode select unit 40 would equal (number of predictor modes)×(number of PDPC parameter sets+1).

After selecting an intra-prediction mode for a block, mode select unit 40 may provide information indicative of the selected intra-prediction mode and PDPC prediction parameters for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, prediction parameters (either the prediction parameter values or a single value corresponding to a predefined set of prediction parameters), an intra-prediction mode index table, and a modified intra-prediction mode index table to use for each of the contexts. Video encoder 20 may include prediction parameters in one or more of a video parameter set (VPS), a sequence parameter set (SPS), a picture parameter set (PPS), a slice header, a block header, or other such data.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising transform coefficient values. Wavelet transforms, integer transforms, sub-band transforms, discrete sine transforms (DSTs), or other types of transforms could be used instead of a DCT. In any case, transform processing unit 52 applies the transform to the residual block, producing a block of transform coefficients. The transform may convert the residual information from a pixel domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter.

Following quantization, entropy encoding unit 56 scans and entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain. In particular, summer 62 adds the reconstructed residual block to the motion compensated prediction block earlier produced by motion compensation unit 44 or intra-prediction unit 46 to produce a reconstructed video block for storage in reference picture memory 64. The reconstructed video block may be used by motion estimation unit 42 and motion compensation unit 44 as a reference block to inter-code a block in a subsequent video frame.

Video encoder 20 generally uses the process discussed above to encode each block of each picture in a coded video sequence. In addition, in some examples, video encoder 20 may determine temporal layers to which to assign each of the pictures. Furthermore, video encoder 20 may be configured to encode pictures of other layers, e.g., other views, scalable video coding layers, or the like. In any case, video encoder 20 may further encode data indicating a layer to which each picture belongs, for one or more layers (e.g., of various video dimensions).

Figure 7:
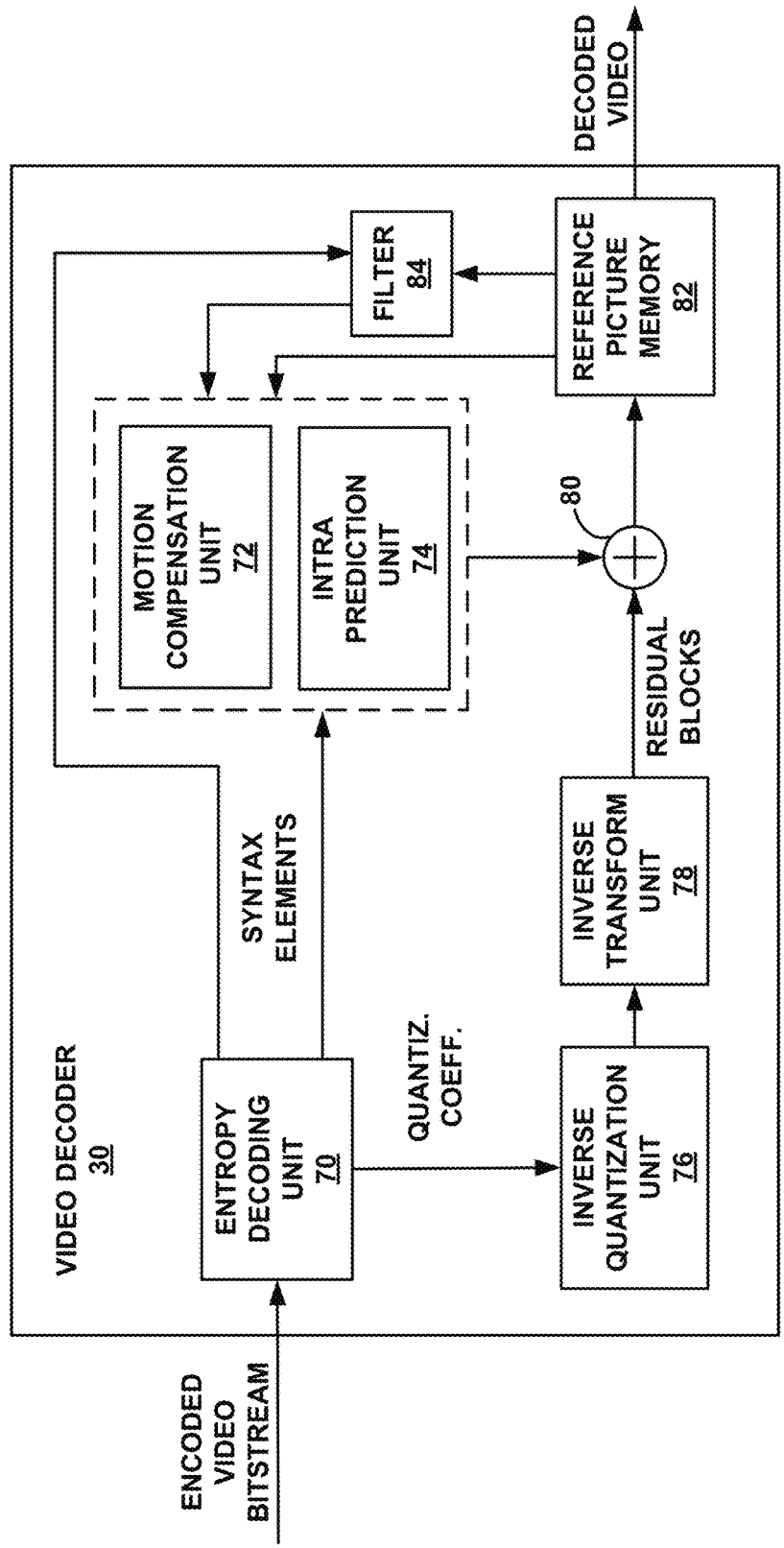
FIG. 7 is a block diagram illustrating an example of a video decoder that may implement techniques described in this disclosure.

FIG. 7 is a block diagram illustrating an example of video decoder 30 that may implement techniques described in this disclosure. In accordance with this disclosure, video decoder 30 may be configured to apply the techniques described in this disclosure, such as techniques relating to improved video intra-prediction using position-dependent prediction combination. In the example of FIG. 7, video decoder 30 includes an entropy decoding unit 70, motion compensation unit 72, intra-prediction unit 74, inverse quantization unit 76, inverse transformation unit 78, reference picture memory 82, low-pass filter 84, and summer 80. Video decoder 30 may, in some examples, perform a decoding pass generally reciprocal to the encoding pass described with respect to video encoder 20 (FIG. 6). Motion compensation unit 72 may generate prediction data based on motion vectors received from entropy decoding unit 70 (both directly and via low-pass filter 84), while intra-prediction unit 74 may generate prediction data based on intra-prediction mode indicators and prediction parameters received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, PDPC prediction parameters, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra-prediction unit 74 may generate prediction data for a video block of the current video slice based on a signaled intra prediction mode, prediction parameters, and data from previously decoded blocks of the current frame or picture. Some or all of the decoded blocks of the current frame or picture are filtered via the low-pass filter 84 for use by intra-prediction unit 74.

Intra-prediction unit 74 may perform prediction from a nonfiltered or a filtered set of neighboring "reference" pixels, depending on the selected predictor mode and block size using position-dependent prediction coordination. Filtered reference pixels may be filtered via low-pass filter 84. Intra-prediction unit 74 may use one or more of a number of exemplary formulas (1)-(8) defined above to calculate a combined predicted value of a pixel.

In one example intra-prediction unit 74, when given any two set of pixel predictions $p_r[x,y]$ and $q_s[x,y]$, computed using only the unfiltered and filtered references r and s, respectively, may calculate a combined predicted value of a pixel, denoted by $v[x,y]$, via formula (1) as defined above.

In another example intra-prediction unit 74 may utilize an equation with a smaller parameter set. In such examples $c[x,y]$ may be defined by a much smaller set of parameters, plus an equation to compute all combination values from those parameters. In such an example formula (2) as defined above may be used by intra-prediction unit 74.

In another example, the formula can be chosen to facilitate computations. For example, intra-prediction unit 74 may use a predictor as defined in formula (4) above. Such an approach may exploit the linearity of the HEVC (or other) prediction as shown in formulas (7) and (8) above.

Intra-prediction unit 74 may use decoded prediction parameters (e.g., $c[x,y]$, $c_1^v$, $c_2^v$, $c_1^h$, $c_2^h$, g, $d_v$, and/or $d_h$) that correspond with the prediction equation used by intra-prediction unit 74 to calculate the predicted block.

When the video frame is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference picture memory 82. Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., dequantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 or intra-prediction unit 74 generates the predictive block for the current video block based on the motion vectors and other syntax elements, video decoder 30 forms a decoded video block by summing the residual blocks from inverse transform unit 78 with the corresponding predictive blocks generated by motion compensation unit 72 or intra-prediction unit 74. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 5.

Video decoder 30 generally uses the process discussed above to decode each block of each picture in a coded video sequence. In addition, in some examples, video decoder 30 may decode data indicating temporal layers to which pictures are assigned. Furthermore, video decoder 30 may be configured to decode pictures of other layers, e.g., other views, scalable video coding layers, or the like. In any case, video decoder 30 may further decode data indicating a layer to which each picture belongs, for one or more layers (e.g., of various video dimensions).

Figure 8:
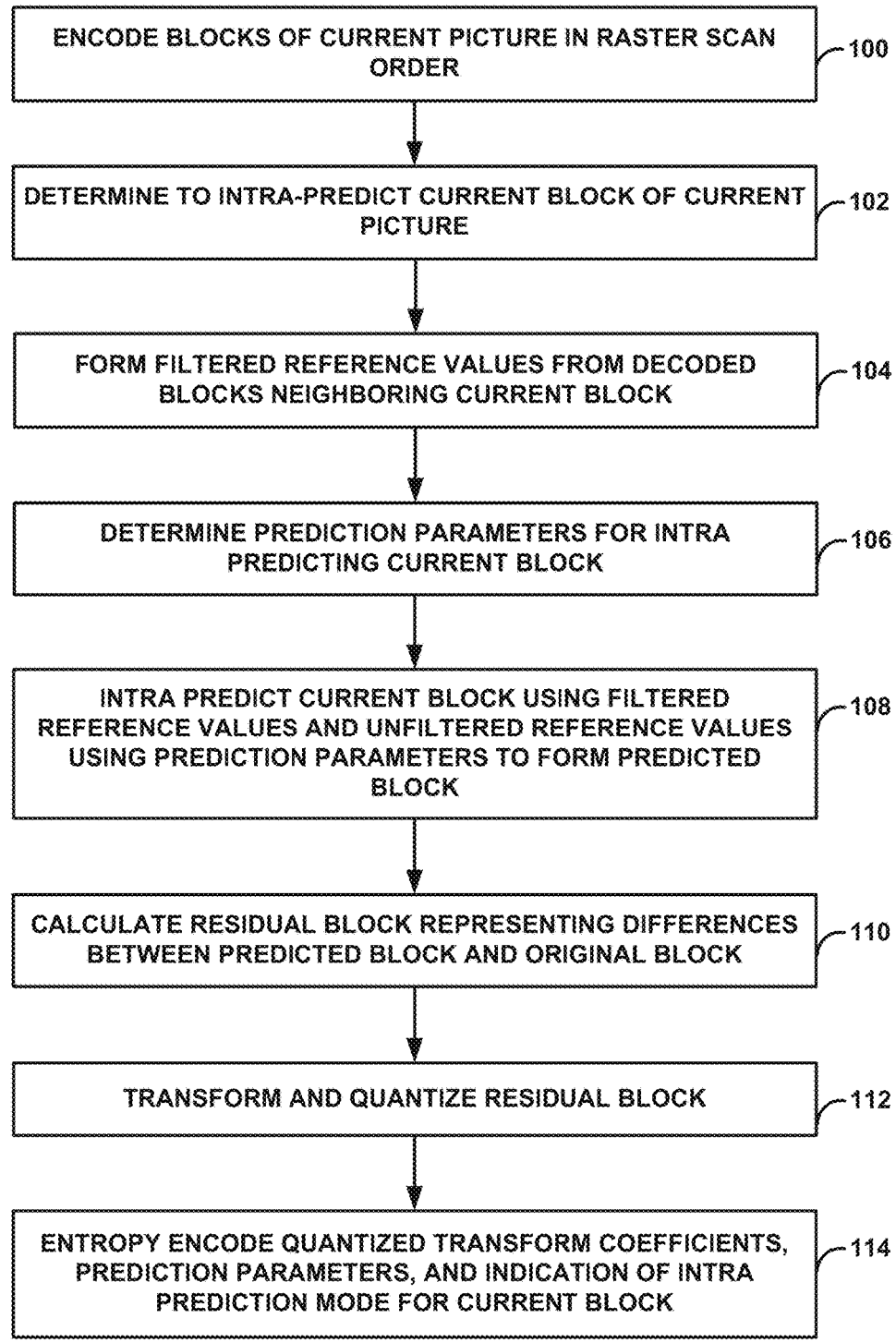
FIG. 8 is a flowchart illustrating an example method according to the techniques of this disclosure.

FIG. 8 is a flowchart illustrating an example method according to the techniques of this disclosure. In one example of the disclosure, intra-prediction unit 46 in video encoder 20 may be configured to encode blocks of a current picture in raster scan order (100). Video encoder 20 may be further configured to determine to intra-predict a current block of a current picture (102). Video encoder 20 may be further configured to form filtered reference values from decoded blocks neighboring the current block (104). Low-pass filter 66 may be configured to filter the foregoing reference values. Video encoder 20 may be further configured to determine prediction parameters for intra predicting current block (106). Determining prediction parameters may include lopping through various parameters to determine the parameter set that is optimal. Additional examples include selecting a subset of all prediction parameters and checking each parameter combination of the subset to select a parameter set that is optimal. Optimal parameter set selection may be based on a rate-distortion analysis.

Video encoder 20 may be further configured to intra predict the current block using filtered reference values and unfiltered reference values using prediction parameters to form predicted block (108). In an example, video encoder 20 may be configured to generate a predictive block by computing a set of predictive values associated with a set of pixels based on a linear combination of one or more of the plurality of filtered reference values in the filtered reference array multiplied by a first set of weights and the one or more of the plurality of non-filtered reference values in the non-filtered reference array multiplied by a second set of weights. In an example, computing the set of predictive values comprises computing the set of predictive values a plurality of times with differing parameter values and selecting an optimal parameter set of the differing parameter values. Video encoder 20 may be configured to generate the predictive block via any of parametric formulas (1)-(8) discussed above.

Video encoder 20 may be further configured to calculate residual block representing differences between predicted block and original block (110). Video encoder 20 may be further configured to transform and quantize residual block (112). Video encoder 20 may be further configured to entropy encode quantized transform coefficients, prediction parameters, and indication of intra prediction mode for current block (114). Video encoder 20 may be further configured to generate a bitstream with the entropy encoded quantized transform coefficients, prediction parameters, and indication of intra prediction mode for current block.

Figure 9:
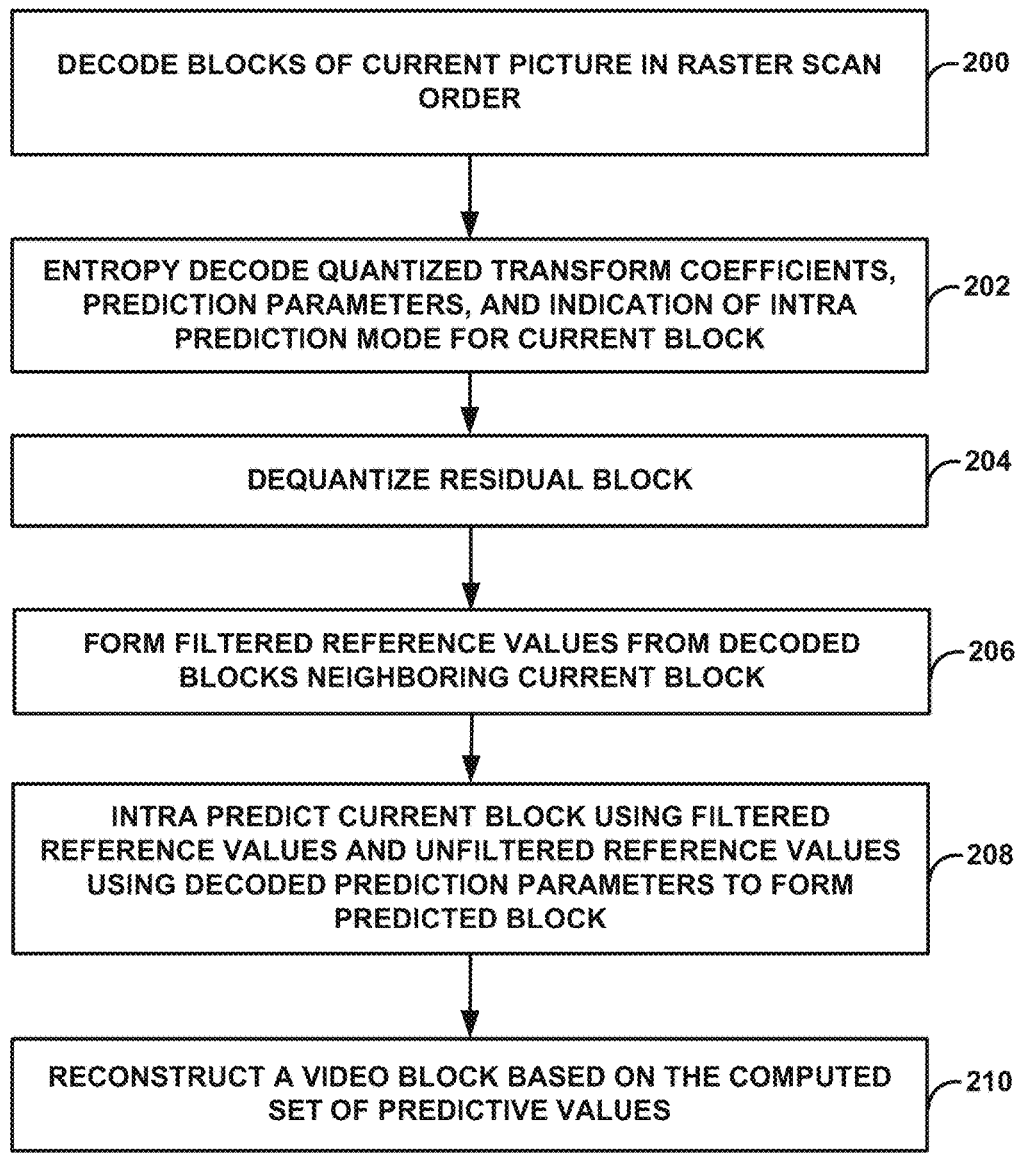
FIG. 9 is a flowchart illustrating an example method according to the techniques of this disclosure.

FIG. 9 is a flowchart illustrating an example method according to the techniques of this disclosure. In one example of the disclosure, intra-prediction unit 74 in video decoder 30 may be configured to decode blocks of current picture in raster scan order (200). Video decoder 30 may be further configured to entropy decode quantized transform coefficients, prediction parameters, and indication of intra prediction mode for current block (202).

Video decoder 30 may be further configured to dequantize the residual block (204).

Video decoder 30 may be further configured to form filtered reference values from decoded blocks neighboring current block (206).

Video decoder 30 may be further configured to intra predict current block using filtered reference values and unfiltered reference values using decoded prediction parameters to form predicted block (208). In an example, video decoder 30 may be configured to compute a set of predictive values associated with a set of pixels based on a linear combination of one or more of the plurality of filtered reference values in the filtered reference array multiplied by a first set of weights and the one or more of the plurality of non-filtered reference values in the non-filtered reference array multiplied by a second set of weights. In an example, the first set of weights and the second set of weights vary based on a position of a predicted pixel of the set of pixels. In another example, a first weight within the first set of weights is greater than a second weight of the first set of weights where a first distance between a first predictive value of the set of predicted values associated with the first weight and the filtered reference array is greater than a second distance between a second predictive value of the set of predicted values associated with the second weight and the filtered reference array. In such an example, predictive pixels within the predictive block that are farther from the reference pixels, the weight of the filtered reference pixels is larger.

In a further example, video decoder 30 may be configured to compute a set of unfiltered prediction values based on the plurality of non-filtered reference values in the non-filtered reference array and compute a set of filtered prediction values based on the plurality of filtered reference values in the filtered reference array. The set of unfiltered prediction values and the set of filtered prediction values may be based on one or more directional predictor parameters (e.g., directional prediction mode such as HEVC directional prediction modes described in FIG. 2 above) decoded from the bitstream.

In an example, video decoder 30 may be configured to compute the set of predictive values via parametric formulas (1)-(8) as discussed above.

Video decoder 30 may be further configured to reconstruct a video block based on the computed set of predictive values (210).

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   decoding neighboring blocks to a current block in a picture of video data;
   forming a filtered reference array comprising a plurality of filtered reference values comprising filtered versions of neighboring pixels to the current block in the neighboring blocks;
   forming a non-filtered reference array comprising a plurality of non-filtered reference values corresponding to non-filtered versions of the neighboring pixels;
   computing a set of predictive values associated with a set of pixels of the current block based on a linear combination of one or more of the plurality of filtered reference values in the filtered reference array multiplied by a first set of weights and one or more of the plurality of non-filtered reference values in the non-filtered reference array multiplied by a second set of weights, wherein each of the first set of weights and the second set of weights comprises values greater than zero and less than one, and wherein the set of predictive values includes a first predictive value and a second predictive value, the second predictive value being different than the first predictive value; and reconstructing the current block based on the computed set of predictive values.

2. The method of claim 1, wherein the first set of weights and the second set of weights vary based on a position of a predictive value associated with the set of pixels.

3. The method of claim 2, wherein a first weight within the first set of weights is greater than a second weight of the first set of weights when a first distance between a first predictive value of the set of predictive values associated with the first weight and the filtered reference array is greater than a second distance between a second predictive value of the set of predictive values associated with the second weight and the filtered reference array.

4. The method of claim 1, further comprising:
computing a set of non-filtered predictive values based on the plurality of non-filtered reference values in the non-filtered reference array; and
computing a set of filtered predictive values based on the plurality of filtered reference values in the filtered reference array,
wherein computing the set of predictive values comprises computing the set of predictive values using the set of non-filtered predictive values and the set of filtered predictive values.

5. The method of claim 4, wherein the set of non-filtered predictive values and the set of filtered predictive values are based on an intra coding directional mode.

6. The method of claim 1, wherein computing the set of predictive values comprises computing the set of predictive values via a parametric formula:

$$v[x,y]=c[x,y]p_r[x,y]+(1-c[x,y])q_s[x,y],$$

wherein x represents a column identifier for a pixel of the current block and y represents a row identifier for the pixel of the current block, v[x,y] represents a combined predictive value for the pixel of the current block at a position defined by x and y, $p_r[x,y]$ represents one or more of a plurality of non-filtered predictive values based on the plurality of non-filtered reference values, $q_s[x,y]$ represents one or more of a plurality of filtered predictive values based on the plurality of filtered reference values in the filtered reference array, c represents the second set of weights, and 1−c represents the first set of weights.

7. The method of claim 1, wherein computing the set of predictive values comprises computing the set of predictive values via a parametric formula:

$$v[x,y] = \left\lfloor \frac{c_1^{(v)}r[x,-1] - c_2^{(v)}r[-1,-1]}{2^{\lfloor y/d_v \rfloor}} \right\rfloor + \left\lfloor \frac{c_1^{(h)}r[-1,y] - c_2^{(h)}r[-1,-1]}{2^{\lfloor x/d_h \rfloor}} \right\rfloor + \left( \frac{N - \min(x,y)}{N} \right) g \, p_r^{(STD)}[x,y] + b[x,y] \, q_s^{(STD)}[x,y]$$

where x represents a column identifier for a pixel of the current block and y represents a row identifier for a pixel of the current block, v[x,y] represents a combined predictive value, r represents the non-filtered reference array, the second set of weights comprise $c_1^v, c_2^v, c_1^h, x_2^h, g, d_v$, and $d_h$ which are prediction parameters, N is a size of the current block $p_r^{(STD)}[x,y]$ represents the plurality of non-filtered reference values calculated according to a non-filtered prediction of a video coding standard, $q_s^{(STD)}[x,y]$ represents the plurality of filtered reference values calculated according to a filtered prediction of the video coding standard, the first set of weights comprise b[x,y] which represents a normalization factor, and min( ) represents a minimum function.

8. The method of claim 7, wherein:

$$b[x,y] = 1 - \left\lfloor \frac{c_1^{(v)} - c_2^{(v)}}{2^{\lfloor y/d_v \rfloor}} \right\rfloor - \left\lfloor \frac{c_1^{(h)} - c_2^{(h)}}{2^{\lfloor x/d_h \rfloor}} \right\rfloor - \left( \frac{N - \min(x,y)}{N} \right) g.$$

9. The method of claim 1, wherein computing the set of predictive values comprises computing the set of predictive values via a parametric formula:

$$v[x,y] = \left\lfloor \frac{c_1^{(v)}r[x,-1] - c_2^{(v)}r[-1,-1]}{2^{\lfloor y/d_v \rfloor}} \right\rfloor + \left\lfloor \frac{c_1^{(h)}r[-1,y] - c_2^{(h)}r[-1,-1]}{2^{\lfloor x/d_h \rfloor}} \right\rfloor + b[x,y] \, p_{a,r,s}^{(STD)}[x,y],$$

where $$b[x,y] = 1 - \left\lfloor \frac{c_1^{(v)} - c_2^{(v)}}{2^{\lfloor y/d_v \rfloor}} \right\rfloor - \left\lfloor \frac{c_1^{(h)} - c_2^{(h)}}{2^{\lfloor x/d_h \rfloor}} \right\rfloor, \text{ and}$$

$$p_{a,r,s}^{(STD)}[x,y] = a \, p_r^{(STD)}[x,y] + (1-a) \, q_s^{(STD)}[x,y],$$

where x represents a column identifier for a pixel of the current block and y represents a row identifier for a pixel of the current block, v[x,y] represents a combined predictive value, r represents the non-filtered reference array, the second set of weights comprise a, $c_1^v, c_2^v, c_1^h, x_2^h, d_v$, and $d_h$ which are prediction parameters, the first set of weights comprises b[x,y], $p_r^{(STD)}[x,y]$ represents the plurality of non-filtered reference values calculated according to a non-filtered prediction of a video coding standard, $q_s^{(STD)}[x,y]$ represents the plurality of filtered reference values calculated according to a filtered prediction of the video coding standard.

10. A method of encoding video data, the method comprising:
receiving a current block of a picture;
decoding neighboring blocks to a current block in a picture of video data;
forming a filtered reference array comprising a plurality of filtered reference values comprising filtered versions of neighboring pixels to the current block in the neighboring blocks;
forming a non-filtered reference array comprising a plurality of non-filtered reference values corresponding to non-filtered versions of the neighboring pixels;
generating a predictive block for the current block, wherein generating comprises computing a set of predictive values associated with a set of pixels of the current block based on a linear combination of one or more of the plurality of filtered reference values in the filtered reference array multiplied by a first set of weights and one or more of the plurality of non-filtered reference values in the non-filtered reference array multiplied by a second set of weights, wherein each of the first set of weights and the second set of weights comprises values greater than zero and less than one, and wherein the set of predictive values includes a first predictive value and a second predictive value, the second predictive value being different than the first predictive value;

generating a residual block based on a difference between the current block and the predictive block; and encoding data that represents the residual block in a bitstream.

11. The method of claim 10, wherein the computing the set of predictive values comprises:

computing a plurality of sets of predictive values using different parameter values; and selecting one of the sets of predictive values as an optimal set of predictive values.

12. The method of claim 11, wherein selecting the one of the sets of predictive values as the optimal set of predictive values comprises:

performing a rate-distortion analysis on the plurality of sets of predictive values; and selecting the one of the sets of predictive values that yields the best rate-distortion performance among the plurality of sets of predictive values.

13. The method of claim 12, wherein generating a predictive block for the current block further comprises:

computing a second set of predictive values associated with a set of pixels of the current block based one or more of the plurality of filtered reference values in the filtered reference array or the one or more of the plurality of non-filtered reference values in the non-filtered reference array;

performing a second rate-distortion analysis on the second set of predictive values; and selecting one of the second set of predictive values and the optimal set of predictive values.

14. The method of claim 11, further comprising encoding the parameter values corresponding to the selected one of the sets of predictive values in the bitstream.

15. A device for decoding video data, the device comprising:

a memory configured to store video data associated with a picture; and one or more processors in communication with the memory and are configured to:

decode neighboring blocks to a current block in the picture of video data;

form a filtered reference array comprising a plurality of filtered reference values comprising filtered versions of neighboring pixels to the current block in the neighboring blocks;

form a non-filtered reference array comprising a plurality of non-filtered reference values corresponding to non-filtered versions of the neighboring pixels;

compute a set of predictive values associated with a set of pixels of the current block based on a linear combination of one or more of the plurality of filtered reference values in the filtered reference array multiplied by a first set of weights and one or more of the plurality of non-filtered reference values in the non-filtered reference array multiplied by a second set of weights, wherein each of the first set of weights and the second set of weights comprises values greater than zero and less than one, and wherein the set of predictive values includes a first predictive value and a second predictive value, the second predictive value being different than the first predictive value; and reconstruct the current block based on the computed set of predictive values.

16. The device of claim 15, wherein the first set of weights and the second set of weights vary based on a position of a predictive value associated with the set of pixels.

17. The device of claim 16, wherein a first weight within the first set of weights is greater than a second weight of the first set of weights when a first distance between a first predictive value of the set of predictive values associated with the first weight and the filtered reference array is greater than a second distance between a second predictive value of the set of predictive values associated with the second weight and the filtered reference array.

18. The device of claim 15, wherein the one or more processors configured to:

compute a set of non-filtered predictive values based on the plurality of non-filtered reference values in the non-filtered reference array; and compute a set of filtered predictive values based on the plurality of filtered reference values in the filtered reference array, wherein the one or more processors configured to compute the set of predictive values comprises the one or more processors configured to compute the set of predictive values using the set of non-filtered predictive values and the set of filtered predictive values.

19. The device of claim 18, wherein the set of non-filtered predictive values and the set of filtered predictive values are based on an intra coding directional mode.

20. The device of claim 15, wherein the one or more processors configured to compute the set of predictive values comprises the one or more processors configured to compute the set of predictive values via a parametric formula:

$$v[x,y]=c[x,y]p_r[x,y]+(1-c[x,y])q_s[x,y],$$

wherein x represents a column identifier for a pixel of the current block and y represents a row identifier for the pixel of the current block, v[x,y] represents a combined predictive value for the pixel of the current block at a position defined by x and y, $p_r[x,y]$ represents one or more of a plurality of non-filtered predictive values based on the plurality of non-filtered reference values, $q_s[x,y]$ represents one or more of a plurality of filtered predictive values based on the plurality of filtered reference values in the filtered reference array, c represents the second set of weights, and 1−c represents the first set of weights.

21. The device of claim 15, wherein the one or more processors configured to compute the set of predictive values comprises the one or more processors configured to compute the set of predictive values via a parametric formula:

$$v[x,y] = \left\lfloor \frac{c_1^{(v)}r[x,-1]-c_2^{(v)}r[-1,-1]}{2^{\lfloor y/d_v \rfloor}} \right\rfloor + \left\lfloor \frac{c_1^{(h)}r[-1,y]-c_2^{(h)}r[-1,-1]}{2^{\lfloor x/d_h \rfloor}} \right\rfloor + \left(\frac{N-\min(x,y)}{N}\right) g \ p_r^{(STD)}[x,y] + b[x,y] \ q_s^{(STD)}[x,y]$$

where x represents a column identifier for a pixel of the current block and y represents a row identifier for a pixel of the current block, v[x,y] represents a combined predictive value, r represents the non-filtered reference array, the second set of weights comprise $c_1^v$, $c_2^v$, $c_1^h$, $x_2^h$, g, $d_v$, and $d_h$ which are prediction parameters, N is a size of the current block, $p_r^{(STD)}[x,y]$ represents the plurality of non-filtered reference values calculated according to a non-filtered prediction of a video coding standard, $q_s^{(STD)}[x,y]$ represents the plurality of filtered reference values calculated according to a filtered prediction of the video coding standard, the first set of weights comprise b [x,y] which represents a normalization factor, and min( ) represents a minimum function.

22. The device of claim 21, wherein:

$$b[x, y] = 1 - \left\lfloor \frac{c_1^{(v)} - c_2^{(v)}}{2^{\lfloor y/d_v \rfloor}} \right\rfloor - \left\lfloor \frac{c_1^{(h)} - c_2^{(h)}}{2^{\lfloor x/d_h \rfloor}} \right\rfloor - \left( \frac{N - \min(x, y)}{N} \right) g.$$

23. The device of claim 15, wherein the one or more processors are configured to compute the set of predictive values via a parametric formula:

$$v[x, y] = \left\lfloor \frac{c_1^{(v)} r[x, -1] - c_2^{(v)} r[-1, -1]}{2^{\lfloor y/d_v \rfloor}} \right\rfloor +$$

$$\left\lfloor \frac{c_1^{(h)} r[-1, y] - c_2^{(h)} r[-1, -1]}{2^{\lfloor x/d_h \rfloor}} \right\rfloor + b[x, y] \; p_{a,r,s}^{(STD)}[x, y],$$

where $$b[x, y] = 1 - \left\lfloor \frac{c_1^{(v)} - c_2^{(v)}}{2^{\lfloor y/d_v \rfloor}} \right\rfloor - \left\lfloor \frac{c_1^{(h)} - c_2^{(h)}}{2^{\lfloor x/d_h \rfloor}} \right\rfloor, \text{ and}$$

$$p_{a,r,s}^{(STD)}[x, y] = a \; p_r^{(STD)}[x, y] + (1 - a) \; q_s^{(STD)}[x, y],$$

where x represents a column identifier for a pixel of the current block and y represents a row identifier for a pixel of the current block, v[x,y] represents a combined predictive value, r represents the non-filtered reference array, the second set of weights comprise a, $c_1^v$, $c_2^v$, $c_1^h$, $x_2^h$, $d_v$, and $d_h$ which are prediction parameters, the first set of weights comprises b [x,y], $p_r^{(STD)}$[x,y] represents the plurality of non-filtered reference values calculated according to a non-filtered prediction of a video coding standard, $q_s^{(STD)}$[x,y] represents the plurality of filtered reference values calculated according to a filtered prediction of the video coding standard.

24. The device of claim 15, wherein the device comprises a display configured to display the picture comprising the decoded video block.

25. The device of claim 15, wherein the device comprises one or more of a camera, a computer, a mobile device, a broadcast receiver device, or a set-top box.

26. A device for encoding video data, the device comprising:
a memory configured to store video associated with a picture; and
one or more processors in communication with the memory and are configured to:
receive a current block of the picture;
decode neighboring blocks to a current block in a picture of video data;
form a filtered reference array comprising a plurality of filtered reference values comprising filtered versions of neighboring pixels to the current block in the neighboring blocks;
form a non-filtered reference array comprising a plurality of non-filtered reference values corresponding to non-filtered versions of the neighboring pixels;
generate a predictive block for the current block, wherein generating comprises computing a set of predictive values associated with a set of pixels of the current block based on a linear combination of one or more of the plurality of filtered reference values in the filtered reference array multiplied by a first set of weights and one or more of the plurality of non-filtered reference values in the non-filtered reference array multiplied by a second set of weights, wherein each of the first set of weights and the second set of weights comprises values greater than zero and less than one, and wherein the set of predictive values includes a first predictive value and a second predictive value, the second predictive value being different than the first predictive value;
generate a residual block based on a difference between the current block and the predictive block; and
encode data that represents the residual block in a bitstream.

27. The device of claim 26, wherein the one or more processors configured to compute the set of predictive values comprises the one or more processors configured to:
compute a plurality of sets of predictive values using different parameter values; and
select one of the sets of predictive values as an optimal set of predictive values.

28. The device of claim 27, wherein the one or more processors configured to select the one of the sets of predictive values as the optimal set of predictive values comprises the one or more processors configured to:
perform a rate-distortion analysis on the plurality of sets of predictive values; and
select the one of the sets of predictive values that yields the best rate-distortion performance among the plurality of sets of predictive values.

29. The device of claim 28, wherein the one or more processors configured to generate a predictive block for the current block further comprises the one or more processors configured to:
compute a second set of predictive values associated with a set of pixels of the current block based one or more of the plurality of filtered reference values in the filtered reference array or the one or more of the plurality of non-filtered reference values in the non-filtered reference array;
perform a second rate-distortion analysis on the second set of predictive values; and
select one of the second set of predictive values and the optimal set of predictive values.

30. The device of claim 27, wherein the one or more processors configured to encode the parameter values corresponding to the selected one of the sets of predictive values in the bitstream.

31. The device of claim 26, wherein the device comprises a camera configured to capture the picture comprising the video block.

32. The device of claim 26, wherein the device comprises one or more of a camera, a computer, a mobile device, a broadcast receiver device, or a set-top box.

33. A device for of decoding video data, the device comprising:
means for decoding neighboring blocks to a current block in a picture of video data;
means for forming a filtered reference array comprising a plurality of filtered reference values comprising filtered versions of neighboring pixels to the current block in the neighboring blocks;
means for forming a non-filtered reference array comprising a plurality of non-filtered reference values corresponding to non-filtered versions of the neighboring pixels;

means for computing a set of predictive values associated with a set of pixels of the current block based on a linear combination of one or more of the plurality of filtered reference values in the filtered reference array multiplied by a first set of weights and one or more of the plurality of non-filtered reference values in the non-filtered reference array multiplied by a second set of weights, wherein each of the first set of weights and the second set of weights comprises values greater than zero and less than one, and wherein the set of predictive values includes a first predictive value and a second predictive value, the second predictive value being different than the first predictive value; and means for reconstructing the current block based on the computed set of predictive values.

34. A device for encoding video data, the device comprising:

means for receiving a current block of a picture;

means for decoding neighboring blocks to a current block in a picture of video data;

means for forming a filtered reference array comprising a plurality of filtered reference values comprising filtered versions of neighboring pixels to the current block in the neighboring blocks;

means for forming a non-filtered reference array comprising a plurality of non-filtered reference values corresponding to non-filtered versions of the neighboring pixels;

means for generating a predictive block for the current block, wherein generating comprises computing a set of predictive values associated with a set of pixels of the current block based on a linear combination of one or more of the plurality of filtered reference values in the filtered reference array multiplied by a first set of weights and one or more of the plurality of non-filtered reference values in the non-filtered reference array multiplied by a second set of weights, wherein each of the first set of weights and the second set of weights comprises values greater than zero and less than one, and wherein the set of predictive values includes a first predictive value and a second predictive value, the second predictive value being different than the first predictive value;

means for generating a residual block based on a difference between the current block and the predictive block; and means for encoding data that represents the residual block in a bitstream.

35. A non-transitory computer-readable medium having stored thereon instructions for processing video data that, when executed, cause one or more processors to:

decode neighboring blocks to a current block in a picture of video data;

form a filtered reference array comprising a plurality of filtered reference values comprising filtered versions of neighboring pixels to the current block in the neighboring blocks;

form a non-filtered reference array comprising a plurality of non-filtered reference values corresponding to non-filtered versions of the neighboring pixels;

compute a set of predictive values associated with a set of pixels of the current block based on a linear combination of one or more of the plurality of filtered reference values in the filtered reference array multiplied by a first set of weights and one or more of the plurality of non-filtered reference values in the non-filtered reference array multiplied by a second set of weights, wherein each of the first set of weights and the second set of weights comprises values greater than zero and less than one, and wherein the set of predictive values includes a first predictive value and a second predictive value, the second predictive value being different than the first predictive value; and reconstruct the current block based on the computed set of predictive values.

36. A non-transitory computer-readable medium having stored thereon instructions for processing video data that, when executed, cause one or more processors to:

receive a current block of a picture;

decode neighboring blocks to a current block in a picture of video data;

form a filtered reference array comprising a plurality of filtered reference values comprising filtered versions of neighboring pixels to the current block in the neighboring blocks;

form a non-filtered reference array comprising a plurality of non-filtered reference values corresponding to non-filtered versions of the neighboring pixels;

generate a predictive block for the current block, wherein generating comprises computing a set of predictive values associated with a set of pixels of the current block based on a linear combination of one or more of the plurality of filtered reference values in the filtered reference array multiplied by a first set of weights and one or more of the plurality of non-filtered reference values in the non-filtered reference array multiplied by a second set of weights, wherein each of the first set of weights and the second set of weights comprises values greater than zero and less than one, and wherein the set of predictive values includes a first predictive value and a second predictive value, the second predictive value being different than the first predictive value;

generate a residual block based on a difference between the current block and the predictive block; and encode data that represents the residual block in a bitstream.

* * * * *